United States Patent [19]

Sakakibara

[11] 4,367,804

[45] Jan. 11, 1983

[54] VEHICLE CONSTANT SPEED DRIVING APPARATUS

[75] Inventor: Naoji Sakakibara, Chiryu, Japan

[73] Assignee: Aisin Seiki Kabushiki Kaisha, Japan

[21] Appl. No.: 192,873

[22] Filed: Oct. 1, 1980

[30] Foreign Application Priority Data

Oct. 3, 1979 [JP] Japan .................. 54-127471

[51] Int. Cl.$^3$ ........................................... B60K 31/00
[52] U.S. Cl. .................. 180/176; 123/360; 180/177
[58] Field of Search ............... 180/177, 175, 178, 179, 180/176; 361/242; 123/360

[56] References Cited

U.S. PATENT DOCUMENTS

| | | | |
|---|---|---|---|
| 4,196,787 | 4/1980 | Sakakibara et al. | 180/179 |
| 4,202,424 | 5/1980 | Sakakibara et al. | 123/360 X |
| 4,232,757 | 11/1980 | Ochiai et al. | 180/176 |

Primary Examiner—Joseph F. Peters, Jr.
Assistant Examiner—Michael Mar

Attorney, Agent, or Firm—Finnegan, Henderson, Farabow, Garrett & Dunner

[57] ABSTRACT

Vehicle constant speed driving apparatus including a solenoid of a releasing valve for directing atmosphere into a hydraulic actuator when the releasing valve solenoid releases a constant speed driving which is in ON-condition (not causing ON-OFF repeated operation) in order to isolate an interior chamber of the hydraulic actuator from the atmosphere during the constant speed driving, and a modulator valve solenoid located adjacent to a releasing valve solenoid so that both solenoids are held in a substantially same thermal condition. The current flowing to the releasing valve solenoid is controlled to a constant value and a voltage varied by such constant current control is applied to the modulator valve solenoid to compensate for changes in the temperature of and the voltage supplied to the modulator valve solenoid, thereby maintaining at a constant value the current flowing to the modulator valve solenoid and providing a vehicle constant speed driving apparatus for minimizing a variation in the driving speed.

2 Claims, 4 Drawing Figures

VEHICLE CONSTANT SPEED DRIVING APPARATUS

BACKGROUND OF THE INVENTION

This invention relates to a vehicle constant speed driving apparatus and, more particularly, to a vehicle constant speed driving apparatus for controlling the opening of a throttle valve by operating a hydraulic (vacuum) actuator having a modulator valve for adjusting pressure by a duty control, such as a rate of operating time.

Conventional modulator valves have had drawbacks that their capacity to adjust pressure varies in response to changes in the voltage of associated power sources and changes in the resistance of solenoids of the modulator valves thereby resulting in deviations in driving speeds. Changes in the voltage of a power source may be compensated for by maintaining at a constant value the voltage applied to a solenoid of a modulator valve, but it is difficult to compensate for the changes in the resistance of a solenoid resulting from changes in the temperature. The latter problem may be solved by maintaining at a constant value the current flowing through a solenoid of a modulator valve, but this is difficult in view of the inductance of the solenoid, because the ON-OFF repetition cycle of the solenoid is fast (ordinarily 20–80 Hz) in a valve system for adjusting pressure by the rate of operating time.

SUMMARY OF THE INVENTION

Therefore, the present invention has for its object to employ the facts that a solenoid of a releasing valve for directing atmosphere into a hydraulic actuator when the releasing valve solenoid releases a constant speed driving is continuously in ON-condition (not causing ON-OFF repeated operation) to isolate the interior of the hydraulic actuator from the atmosphere during the constant speed driving and that the modulator valve solenoid and the releasing valve solenoid are located adjacent to each other to be held in a substantially same thermal condition, so that the current flowing to the releasing valve solenoid is controlled to a constant value and a voltage varied by such constant current control is applied to the modulator valve solenoid to compensate for changes in the temperature and the voltage applied to the modulator valve solenoid, thereby maintaining at a constant value the current flowing to the modulator valve solenoid and thus providing a vehicle constant speed driving apparatus for minimizing a variation in the driving speed.

DESCRIPTION OF THE PREFERRED EMBODIMENT

Figure 1:
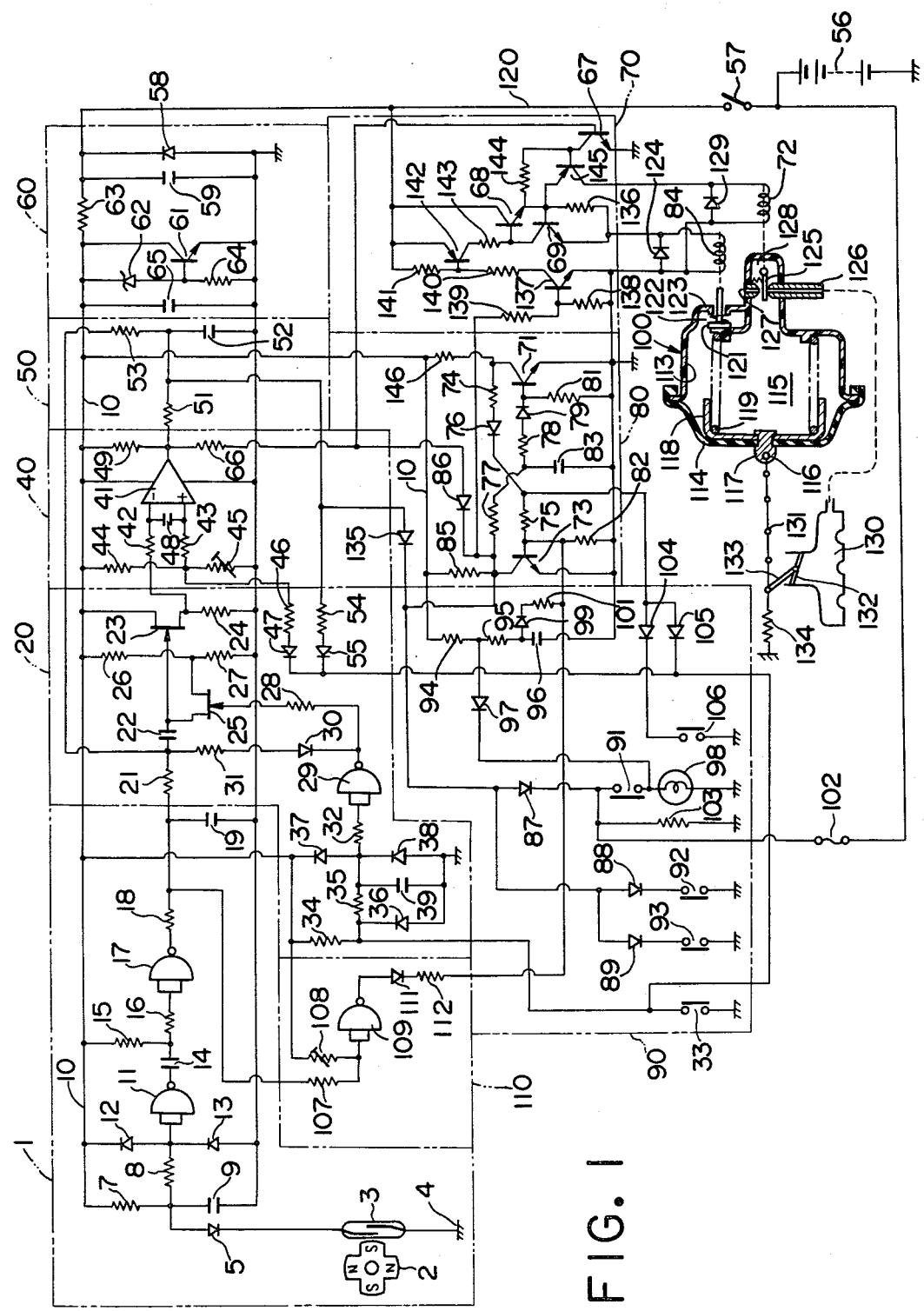
FIG. 1 is a circuit diagram of an embodiment of the present invention.

In FIG. 1, there is provided a circuit for generating a voltage in response to a vehicle speed referred to by a reference numeral 1 and which includes a thermal lead switch 3 operated by a magnet rotor 2 rotating at a same speed as that of a speed meter cable of the vehicle, the switch being connected at its one end to a ground 4 and at the other end to one end of a diode 5 which, in turn is connected at its other end to one end of each of resistors 7, 8 and a capacitor 9. The other end of the resistor 7 is connected to a constant voltage bus 10 and the other end of the capacitor 9 is connected to the ground 4. The other end of the resistor 8 together with one end each of diodes 12, 13 are connected to an input terminal of NAND gate 11 of a metal oxide semiconductor (MOS) device. The diodes 12, 13 are connected at their other ends to the bus 10 and the ground 4, respectively. Connected to an output terminal of the NAND gate 11 is a capacitor 14 which serves to determine a metastable time of a monostable multivibrator constituted by a resistor 15 connected at its one end to the capacitor 14 and at its opposite end to the bus 10 and by a resistor 16 and a NAND gate 17. A resistor 18 connected to an output terminal of the NAND gate 17 and a capacitor 19 constitute an integrating circuit.

A reference numeral 20 designates a circuit for memorizing a desired target vehicle speed and generating a signal corresponding to a speed differential between the actual speed and the targeted speed, the circuit 20 comprising an input resistor 21, a memory capacitor 22 and a gate of an impedance converting FET 23 connected in series, a drain terminal of FET 23 connected to the constant voltage bus 10 and a source terminal of FET 23 connected to the ground 4 through a resistor 24. A numeral 25 designates an analog switch FET a drain terminal of which is connected to the gate of FET 23, and a source terminal of FET 25 is connected to a connecting point between resistors 26 and 27 for dividing the voltage between the bus 10 and the ground 4. The gate of FET 25 is connected through a resistor 28 to an output terminal of NAND gate 29. Similarly, the output terminal of NAND gate 29 is connected to a connecting point of the resistor 21 and the capacitor 22 through a diode 30 and a resistor 31. An input terminal of NAND gate 29 receives a signal derived through a resistor 32 from a set switch 33 connected at its opposite end to the ground 4 as will be described later. A resistor 34 serves to bias the NAND gate 29 and is connected to the bus 10 and the opposite end of the switch 33. Connected between this opposite end and the resistor 32 is a circuit for suppressing noise comprising a resistor 35, diodes 36, 37 and 38 and a capacitor 39.

A numeral 40 designates a comparator circuit including a voltage comparator 41, a negative input terminal of the comparator being connected through a resistor 42 to the source terminal of FET 23 and its positive input terminal being connected through a resistor 43 to a connecting point between resistors 44 and 45 for dividing the voltage between the bus 10 and the ground 4 and further connected through a resistor 46 and a diode 47 to the set switch 33. A capacitor 48 connected across the input terminals of the comparator 41 serves to suppress noises. An output terminal of the comparator 41 has connected thereto one end of a load resistor 49 the other end of which is connected to the bus 10. A numeral 50 designates a circuit for generating a negative feed-back signal and which comprises a resistor 51 connected to the output terminal of the comparator 41, a capacitor 52 for integration and a resistor 53 for feeding back the integration output to the connecting point between the resistor 21 and the capacitor 22. A connecting point between the resistor 51 and the capacitor 52 is connected to the set switch 33 through a resistor 54 and a diode 55.

A numeral 60 designates a power source circuit which is of a known arrangement and includes a diode 58 for absorbing an inverse voltage from a power source supplied from a battery 56 through a main switch 57, a capacitor 59 for suppressing noises and a constant voltage circuit comprising a transistor 61, a Zener diode 62, resistors 63, 64 and a capacitor 65 for suppressing ripples.

A numeral 70 designates a power amplifier including a constant current circuit and connecting the output of the comparator 41 through a resistor 66 to a base of a transistor 67.

Transistors 68, 69 and a resistor 136 constitute a constant current circuit the value of the current of which is determined by the resistor 136. A base of a transistor 137 is connected through a resistor 138 to the ground 4 and also through a resistor 139 to a collector of a transistor 73, and an emitter of the transistor 137 is connected to the ground 4 and a collector of the transistor 137 is connected through resistors 140, 141 to a power source line 120. A connecting point between the resistors 140 and 141 is connected with a base of a transistor 142 an emitter of which is connected to the line 120 and a collector of the transistor 142 is connected to through a resistor 143 to the base of the transistor 68 and to the collector of the transistor 69. The emitter of the transistor 67 is connected to the ground 4 and its collector is connected through a resistor 144 to a connecting point of the emitter of transistors 68, 145 the base of the transistor 69 and the resistor 136. The emitter of the transistor 68 is connected through the resistor 136 to one end a releasing valve solenoid 84 of a vacuum actuator 100. The emitter of the transistor 69 is connected to the opposite end of releasing valve solenoid 84.

A numeral 80 designates a self-holding circuit which comprises a bi-stable multivibrator including transistors 71, 73, a collector of the transistor 71 being connected to the base of the transistor 73 through resistors 74, 75 and a diode 76. The collector of the transistor 73 is connected to the base of the transistor 71 through resistors 77, 78 and a diode 79. The bases of the both transistors 71, 73 are further connected to the ground 4 through resistors 81, 82. A capacitor 83 is connected between the ground 4 and a connecting point between the resistors 77 and 78. Furthermore, the collector of the transistor 71 is connected to the bus 10 through a resistor 146. A resistor 85 is connected between the collector of the transistor 73 and the bus 10. Diode 86 is connected between the collector of the transistor 73 and the base of the transistor 67. Diode 135 is connected between the collector of the transistor 73 and the integrated signal level of capacitor 52 and further through diodes 87, 88, 89 to a stop switch 91, a clutch switch 92 and a parking brake switch 93, respectively.

A numeral 90 designates a set and releasing signal circuit in which resistors 94, 95 and capacitor 96 are connected in series between the bus 10 and the ground 4, a connecting point between the resistors 94 and 95 being connected through a diode 97 to one end of a stop lamp 98 and to the stop switch 91, and a connecting point between the resistor 95 and the capacitor 96 being connected to the base of the transistor 73 through a diode 99 and a resistor 101. A connecting point between the stop switch 91 and the diode 87 is connected through a fuse 102 to the battery 56 and also through a resistor 103 to the ground 4. The connecting point between the resistor 75 and the diode 76 is connected through a diode 104 to a resume switch 106 and through a diode 105 to the set switch 33. The set switch 33, the clutch switch 92, the parking brake switch 93 and the resume switch 106 are of a normally open type and are connected at their one end to the ground 4. The stop lamp 98 is also connected at its opposite end to the ground 4.

A numeral 110 designates a low limiter circuit comprising a resistor 107 connected to the capacitor 19 which is the output end of the circuit 1, a resistor 108 connected to the bus 10, a NAND gate 109 receiving an input from a connecting point between these resistors and its output being connected through a diode 111 and a resistor 112 to the base of the transistor 73.

The vacuum actuator 100 is described in detail below.

A diaphragm 114 is sealingly mounted on a housing 113 to form a pressure chamber 115 within the housing 113. Disposed within the pressure chamber is a pressure plate 118 fixed to the diaphragm 114 by a rivet 117 having an output end 116. A compression spring 119 is provided between the pressure plate 118 and an inside of the housing 113 to exert a force on the diaphragm 114 always to urge it in the leftward direction as viewed in the drawing.

A numeral 121 designates a releasing valve normally separated by a spring 122 from a valve seat 123 provided on the housing 113, the releasing valve 121 being for communicating between the pressure chamber 115 and the exterior (atmosphere). When the releasing valve solenoid 84 is energized, the releasing valve 121 is engaged with the valve seat 123 to interrupt the communication between the chamber 115 and the atmosphere. The solenoid 84 is connected at its one end to the emitter of the transistor 69 and at the other end to the ground 4. A diode connected between the opposite ends of the solenoid 84 serves to absorb surging.

A numeral 125 designates a modulator valve interposed between a vacuum nozzle 126 and an atmosphere nozzle 127, the vacuum nozzle 126 being for introducing a negative pressure from an intake manifold 130 of the engine. The modulator valve 125 is normally closed against the vacuum nozzle 126 by a spring 128, thereby normally keeping open the atmosphere nozzle 127. When the modulator valve solenoid 72, held in the same enviromental condition (thermally joined) as that of the releasing valve solenoid 84, is energized, the vacuum nozzle 126 is opened and the atmosphere nozzle 127 is closed. The solenoid 72 is connected at its one end to the collector of the transistor 145 and at the other end to the ground 4. A diode 129 for absorbing surging is connected to the opposite ends.

The output end 116 of the vacuum actuator 100 is connected by a chain 131 and the like to a lever 133 for displacing a throttle valve 132 so that when the diaphragm 114 moves in the rightward direction as viewed in the drawing the throttle valve 132 is open. Spring 134 functions as a return spring for the valve 132.

The operation of the apparatus of the present invention will now be described.

When the main switch 57 is closed, the power is supplied through the line 120 to the power source circuit in which the inverse voltage is absorbed by the diode 58 and noises of relatively high frequency are absorbed by the capacitor 59. If the voltage supplied through the negative voltage resistor 63 to the constant voltage bus 10 is higher than the Zener voltage of the Zener diode 62, the transistor 61 increases its conductivity to lower the voltage of the bus 10, and if the voltage of the bus 10 is lower than the Zener voltage, the conductivity will be reduced to increase the voltage of the bus 10. In this manner, the voltage of the bus is maintained at a constant value. The capacitor 65 absorbs a ripple. Since the magnet rotor 2 is rotated at a speed in proportion to the vehicle speed during driving, the switch 3 is repeatedly closed and opened to generate so-called speed responsive pulses in proportion to the speed of the vehicle.

By the ON-OFF operation of the switch 3, the voltage at the connecting point between the resistor 7 and the capacitor 9 is varied towards the voltage of the bus 10 and towards the voltage of the ground 4. This voltage is then supplied through the resistor 8 to the NAND gate 11 and thus the output thereof is changed to the voltage of the bus 10 or "H" level and to the voltage of the ground 4 or "L" level. The capacitor 9 serves to absorb the effect of chattering in a short time when the switch 3 closes, and the diodes 12, 13 serve to protect the NAND gate 11 from the surge voltage.

The timer circuit comprising the capacitor 14 and the resistor 15 adjusts the time in which when the output of NAND gate 11 turns to "L" the input of NAND gate 17 turns to "L" through the resistor 16 and thereafter the input voltage of NAND gate 17 attains the threshold voltage through the resistor 15. This time is substantially constant and for every opening and closing of the switch 3 the input of NAND gate 17 turns to "L" for a predetermined period and the output of NAND gate 17 turns to "H". Since resistors 15, 16, and NAND gate 17 together act as a monostable multivibrator, by integrating the output of NAND gate 17 with the resistor 18 and capacitor 19 the voltage across the capacitor 19 is proportional to the ON-OFF cycle of the switch 3, and thus is proportional to the speed of the vehicle.

The circuit 20 for generating an error signal between a memorized speed and the actual speed receives the output of the circuit 1 for generating the speed responsive voltage through the resistor 21. When memorizing the vehicle speed, as the set switch 33 closes the input of NAND gate 29 which has been at "H" through the resistors 34, 35, 32 turns to "L" level. As a result, the output of NAND gate 29 turns to "H", so that the gate of FET 25 will turn to "H" through the resistor 28. Thus, FET 25 becomes conductive so that a source voltage, which is the voltage of bus 10 divided by the resistors 26, 27 is applied to the capacitor 22 and the gate of FET 22.

If this source voltage is defined as a reference voltage "C", a voltage "A-C", determined by substracting the reference voltage "C" from a speed responsive voltage "A", is held by the memory capacitor 22. The gate voltage of FET 23 is held at "C" and this voltage is impedance converted and picked up as the source voltage of FET 23 connected with a source follower. When the switch 33 is open, the input of NAND gate 29 becomes "H" and the output becomes "L" and thus the gate of FET 25 becomes "L" to shut off FET 25. At the same time, the cathode of the diode 30 becomes "L", so that the voltage "A" applied across the memory capacitor 22 varies to a voltage "B" (B<A), which is a speed responsive voltage divided by the resistors 21, 31, and the voltage of the gate of FET 23 becomes a value determined by substracting a voltage "A-B" from the voltage "C", namely "C-(A-B)". The gate voltage and source voltage of FET 23 are substantially equal to each other and thus the voltage "C-(A-B)" will be suppied as an output from the source of FET 23, as far as the vehicle speed varies.

If the vehicle is on a down slope and when the actual speed increases to increase by a value "a" the speed responsive voltage at the point between the resistor 21 and the capacitor 22, the voltage across the capacitor 22 is not varied and is held at "(A-C)" and thus the gate and source of FET 23 assume a voltage "C (A-B)+a". Therefore, the source voltage of FET 23 is increased by a voltage corresponding to the increase in the vehicle speed. If the vehicle is on a up slope and when the actual speed decreases, the source voltage of FET 23 will be descreased in response thereto. In this manner, the circuit 20 refers to the source voltage of FET 23 when memorizing a desired vehicle speed and serves to increase the output voltage when the speed increases and decrease the output voltage when the speed decreases.

The comparator circuit 40 is supplied at the positive input terminal of the voltage comparator 41 through the resistor 43 with a constant voltage produced by dividing the voltage of bus 10 by the resistors 44, 45. The negative input terminal is supplied through the resistor 42 with the source voltage of FET 23. The output of the comparator 41 is "H" if the voltage applied to the positive input terminal is higher than that of the negative input terminal and is "L" when the applied voltage of the former is lower than that of the latter. The transistors 67, 145 of the power amplifier 70 operated by this output are in ON-condition when the output of the comparator 41 is "H" and in OFF-condition when that output is "L". If the voltage divided by the resistors 44, 45 is set at a level a little higher than the voltage "C-(A-B)" just after memorizing the vehicle speed, the voltage applied to the positive input terminal of the comparator 41 will be higher than that applied to the negative input terminal and the transistor 67 will be biased to be in ON-condition.

The self-holding circuit 80 is operated such that when the main switch 57 closes the base current flows through the transistor 73 by way of the resistor 146, the resistor 74, the diode 76 and the resistor 75 and instantaneously the transistor 73 turns on. On the other hand, the base current is to flow through the transistor 71 by way of the bus 10, the resistors 85, 77, 78, and the diode 79, but the base current of the transistor 71 is delayed by the capacitor 83 so that it does not turn on prior to the transistor 73. Actually, if the transistor 73 turns on prior to the transistor 71, the transistor 71 continues to be off and the transistor 73 to be on.

While the transistor 73 is held in ON-condition, the current to flow through the resistor 66 to the base of the transistor 67 flows through the diode 86 and the transistor 67 does not turn on even if the output of the comparator 41 is "H". When the set switch 33 or the resume switch 106 closes, the voltage applied to the base of the transistor 73 through the diode 105 or 104 is reduced to prevent the flow of the base current so that the transistor 73 turns off and the collector voltage is increased to cause the flow of the base current through the transistor 71 by way of the resistors 77, 78 and the diode 79 and thus the transistor 71 turns on. When the transistor 71 turns on, the base current does not flow through the transistor 73 and this condition is maintained in which the transistor 71 is on and the transistor 73 is off (even if the set switch 33 and resume switch 106 are open). In this condition, the base current of the transistor 67 is not absorbed through the diode 86 and the transistor 67 will turn on, if the base current flows.

By turning off the transistor 73, the base current is directed to the transistor 137 through the resistors 85, 139 thereby turning on the transistor 137. As a result, current flows from the resistor 140 through the transistor 137 to turn on the transistor 142. This results in the flow of base current through the resistor 143 to the transistor 68 to turn on the transistor 68, thereby causing the flow of current through the resistor 136 to the releasing valve solenoid 84 so that the releasing valve 121 is magnetically attracted against the action of the spring 122 to sealingly engage the valve seat 123.

Since it is designed that immediately after the vehicle speed has been memorized, the positive input terminal of the voltage comparator 41 is supplied with a voltage a little higher than that of the negative input terminal, the output of the comparator 41 becomes "H" and the transistors 67, 145 turn on to energize the modulator valve solenoid 72 so that the modulator valve 125 is operated to open the vacuum nozzle 126 against the action of the spring 128 and close the atmosphere nozzle 127. Consequently, the negative pressure in the intake manifold 130 is introduced into the pressure chamber 115 of the vacuum actuator 100 and thus the pressure differential between this pressure and the atmospheric pressure on the left side of the diaphragm 114 generates a force urge the compression spring 119 in the rightward direction. This force is transmitted through the chain 131 to the throttle valve 132 to open the latter and this condition is maintained by the vacuum actuator 100, even if an accelerator (not shown) is not operated by the driver. The operation of the vacuum actuator 100 is determined by the negative pressure within the pressure chamber 115. This negative pressure is determined by the volume of the pressure chamber 115, the rate of restriction of the vacuum nozzle 126 and the time for which the nozzle 126 is open. The negative pressure generated in the intake manifold 130 during a constant speed driving is not largely varied. Therefore, a longer time of energization of the modulator valve solenoid 72 causes a larger opening of the throttle valve 132.

The signal of this energization time is produced by the negative feed-back signal generating circuit 50 in which the output of the voltage comparator 41 is integrated by the resistor 51 and the capacitor 52. The output thereof is fed back through the resistor 53 to the connecting point of the memory capacitor 22 and the resistor 21 so that when, for example, the vehicle speed is lowered below the memorized speed the voltage applied through the resistor 21 to the capacitor 22 is lowered to reduce the gate and source voltages of the FET 23 and the negative input voltage of the comparator 41, and the output of the comparator 41 is turned to "H". At this time, the modulator valve 125 opens the vacuum nozzle 126 and the throttle valve 132. In this condition, if the opening of the throttle valve 132 is discontinued when the vehicle speed has attained the memorized speed, the vehicle speed will excessively increase, because the vehicle is being accelerated and the throttle valve is largely opened. When the speed has excessively increased, the modulator valve 125 acts to close the vacuum nozzle 126 and open the atmosphere nozzle 127 and if the opening of the atmosphere nozzle 127 is discontinued when the vehicle speed has attained the memorized speed, the vehicle speed will excessively decreases, because the vehicle is being decelerated and the throttle valve is extremely throttled. Therefore, a hunting phenomenon is caused in the operation and the apparatus is unavoidable as a constant driving apparatus and the feeling is also bad.

These problems are effectively solved by the negative feed-back signal generating circuit 50. For example, when the vehicle speed is lowered, the output of the comparator 41 turns to "H" to energize the modulator valve solenoid 72, thereby gradually increasing the voltage of the integrating capacitor 52. This voltage is added through the resistor 53 to the vehicle speed responsive voltage and thus, before the actual speed attains the memorized or targeted speed, a signal for indicating that the vehicle speed is already increased is caused to suppress the acceleration thereby preventing over-acceleration above the memorized speed.

In the event that the speed is excessively increased, the output of the comparator 41 turns to "L" to de-energize the modulator valve 72 thereby displacing the throttle valve towards its closing position and the integrated voltage of the capacitor 52 is also reduced before the vehicle speed is lowered to the memorized speed so that the voltage of the point between the capacitor 22 and the resistor 21 corresponds to the signal that the vehicle speed is already lowered to the memorized speed.

In this manner, control can be initiated before the vehicle speed attains the targeted or memorized speed, or the control can be made to have an advanced phase relative to the actual vehicle speed, and thus over-acceleration and over-deceleration of the vehicle can be prevented.

The operation of the power amplifier 70 will be described in detail below.

Figure 2:
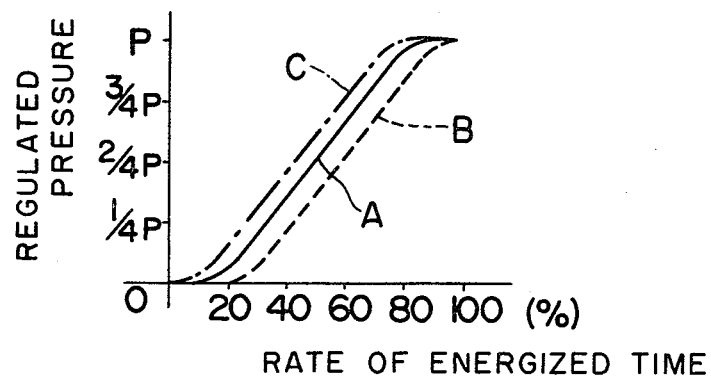
FIG. 2 is a graph of the operating characteristics of an actuator according to an embodiment of the present invention.

Since the output of the circuit 10 contains a little ripple, the output of the circuit 50 also contains a ripple caused by integrating the ON-OFF signals of the comparator 41 and the voltage applied to the negative input terminal of the comparator 41 contains a little ripple, the output of the comparator 41 is rapidly and repeatedly turned to "H" and "L". Such output of the comparator 41 is applied to the modulator valve solenoid 72 through the resistor 66 and the transistors 67, 145. Therefore, in the modulator valve 125 in which the duty control is made by the relatively rapid ON-OFF repetition in response to the output of the comparator 41, its characteristic for adjusting the pressure is varied by the voltage applied to its solenoid 72 and the resistivity of the solenoid 72 itself. This will be described with reference to FIG. 2.

A solid line A shows the pressure adjusting characteristic of the modulator valve 125 measured in room temperature and under the condition of the defined voltage having a repetition frequency, the characteristic being the ratio of the rate of the energization period and the pressure-adjusting pressure. However, when the voltage applied to the modulator lowers or the resistance of the solenoid 72 itself increases (the solenoid being ordinarily made of a copper wire having a temperature-resistance factor which increases as the temperature rises), an increase has to be made in the rate of the energization period to provide a same pressure-adjusting pressure (for example, 2/4P, that is 50% of the supplied pressure) as shown by a dash line B in the drawing. When the voltage increases or the resistance of the solenoid 72 lowers, the rate of the energization period to provide a same pressure-adjusting pressure has to be lowered as shown by a dot-and-dash line C.

Figure 3:
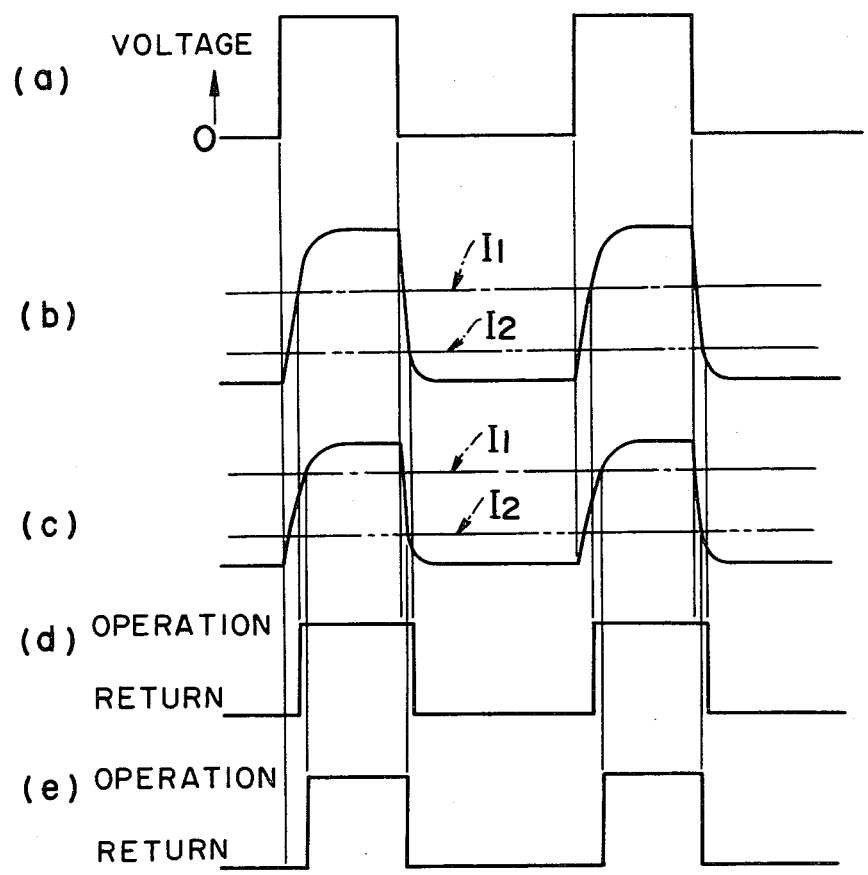
FIG. 3 is a graph showing the operating characteristics of a modulator valve solenoid and a modulator valve according to an embodiment of the present invention.

Describing this more in detail, when the signal of the rate of the energization period (40%) shown in FIG. 3(a) is applied to the modulator valve solenoid 72, if the voltage of the power source is high or the resistance of the solenoid is small, current flows through the solenoid 72 as shown in FIG. 3(b), so that the modulator valve 125 is operated by the operating current $I_1$ and returned by the returning current $I_2$ of the modulator valve 125. This condition is shown in FIG. 3(d). The modulator valve 125 takes about 38% of the operating time. If the voltage applied to the modulator valve solenoid 72 lowers or the resistance of the solenoid 72 increases, the current flowing through the solenoid 72 will be as shown in FIG. 3(c) Nevertheless, the signal shown in FIG. 3(a) is added to the solenoid 72, and the operating time of the modulator valve 125 is only about 34% as shown in FIG. 3(e).

Figure 4:
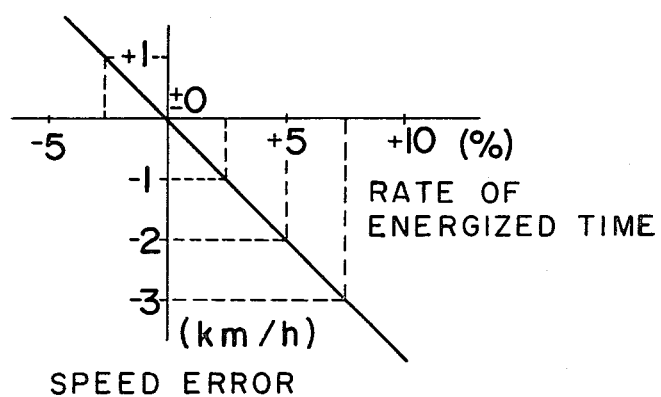
FIG. 4 is a graph showing a relation between errors in the speed and changes in the rate of operating time of a modulator valve solenoid according to an embodiment of the present invention.

The rate of the energization period of the modulator valve solenoid 72 becomes larger as the vehicle speed lowers, and the deviation in the speed from the determined speed and thus the variation in the ratio of the speed error and the energization time are in the relation as shown in FIG. 4, as an example. In such an example, the rate of the energization time varies by 10% for every 4 km/h variation in the speed. If there are 38% and 34% of the operating time of the modulator valve 125 as described above, the difference is 4% and the corresponding difference in the speed is 1.6 km/h. Assuming that, for example, the vehicle is driven at a speed of 80 km/h at which the constant speed apparatus is, in turn, operated to provide zero error in such a condition of the modulator valve 125 as is shown in FIG. 3(d), the driving speed will be lowered to cause a difference of about 1.6 km/h, because the temperature around the attachment of the modulator valve increases to increase the resistance of the solenoid 72.

To avoid this speed error, the constant current circuit is operated and when the resistance of the releasing valve solenoid 84 is low or when the voltage of the power source is high the current flowing through the solenoid 84 passes through the resistor 136, so that when the rate of flow of the current increases the voltage across the resistor 136 is increased to render the transistor 69 more conductive to lower the base and emitter voltages of the transistor 68 thereby reducing the rate of flow of the current through the releasing valve solenoid 84 to maintain it at a determined value. If the voltage of the power source lowers or the resistance of the solenoid 84 increases, the reduction in the rate of flow of the current through the resistor 136 acts to operate the transistor 69 towards its non-conductive condition to increase the base and emitter voltages of the transistor 68 thereby maintaining the rate of flow of the current through the releasing valve solenoid 84 at a constant value. Since the releasing valve solenoid 84 and the modulator valve solenoid 72 are in a substantially same environmental condition and in a same temperature condition, a switching operation of the transistor 145 is caused by the emitter voltage of the transistor 68 to energize the modulator valve solenoid 72 through the emitter and collector of the transistor 145, so that its energization current (the saturated current when energized) is maintained at a substantially constant value to remove the adverse effects of changes in the voltage of the power source and changes in the resistance of the modulator valve solenoid 72. Therefore, the deviation in the driving speed due to the changes in the temperature is minimized to provide a precise and constant speed driving.

During closure of the set switch 33, the voltage of the positive terminal of the comparator 41 is lowered below that of the negative terminal by the diode 47 and the resistor 46 so that the output of the comparator 41 is turned to "L" and the modulator valve solenoid 72 is not energized and thus the pressure in the pressure chamber 115 of the vacuum actuator 100 is the atmospheric pressure to close the throttle valve 132 and reduce the vehicle speed. The vehicle speed is memorized instantaneously with opening the set switch and therefore, a so-called deceleration setting operation can be accomplished in which the set switch is held in its closed condition and thereafter it is opened to decelerate the vehicle speed to make the memory setting. At this time, the charges of the integrating capacitor 52 are cleared through the diode 55 and the resistor 54.

The output of the comparator 41 controls the rapid repetition of "H" and "L", and makes a so-called duty control so that, when the vehicle speed lowers, the time of "H" becomes longer than that of "L". This repeated cycle is substantially equal to the pulse responsive to the vehicle speed, is relatively rapidly repeated so that the pressure in the pressure chamber 115 of the vacuum actuator 100 is hardly varied by the effect of integration of its volume, and is responsible for the duty of operating the modulator valve 125. A voltage responding to this duty is applied across the capacitor 52. This integrated voltage is added to the speed signal and applied to the capacitor 22 through the resistor 53 so that when the switch 33 closes for a short time the value of the resistance is not extremely reduced When the time constant of the resistor 54 and the capacitor 52 is selected to about 1–2 seconds the voltage of the actual speed through the resistor 21 plus the voltage of the negative feed-back through the resistor 53 is memorized as a vehicle speed signal when setting the vehicle speed memory. Thus a speed higher than the actual speed is memorized, contrary to the ordinary setting of the vehicle speed (deceleration setting) described hereinabove. If this operation (the short time closing of the set switch) is repeated, an acceleration setting can be accomplished wherein the memorized speed is progressively increased. The degree of increase in the speed at this time becomes large as the period of closure of set switch 33 is short. When the period of closure of the set switch 33 is long, the capacitor 52 is discharged through the resistor 54 and diode 55 and is not added to the vehicle speed responsive voltage, thereby setting the deceleration. The timing of closure of the set switch makes it possible to perform deceleration setting, acceleration setting and the adjustment of their degrees. In order to release the automatic driving during the constant speed driving, the stop switch 91, or the clutch switch 92 and the parking brake switch 93, may be temporally closed.

When the stop lamp switch 91 is closed, the current which is flowing from the bus 10 through the resistor 94 and diode 97 to the stop lamp 98 flows through the resistor 95, the diode 99 and the resistor 101 to the base of the transistor 73. Transistor 73, in turn, turns on to turn off the transistor 71 and makes the releasing valve solenoid 84 non-conductive. The releasing valve 121 disengages from the valve seat 123 to bring into communication, through a relatively large diameter opening, the pressure chamber 115 of the vacuum actuator 100 and the atmosphere outside thereof, thereby rapidly filling the pressure chamber 115 with the atmosphere to return the diaphragm 114 under the action of the spring 119 to rapidly close the throttle valve 132. At the same time, the base current of the transistor 67 flows through the diode 86 to the collector of the transistor 73. Furthermore, the charges of the integrating capacitor 52 are cleared by the diode 135 to make ready for the subsequent vehicle speed selection or resume operation. The capacitor 96 of the brake releasing line serves to absorb noises conveyed through wires to the stop lamp and other devices.

When the clutch switch 92 and parking brake switch 93 are closed, the current to flow through the diode 86 to the base of the transistor 71 is absorbed to turn off the transistor 71 and turn on the transistor 73 and such condition is held. If the actual vehicle speed lowers below the defined value due to the operation of the low limit circuit 110, the input voltage of the NAND gate 109 becomes lower than the threshold voltage to turn its output to "H". Thus the base current flows through the diode 111 and the resistor 112 to turn on the transistor 73 as in the case of the stop switch 91 being closed. In this manner, even if there is no output of the vehicle speed responsive voltage generating circuit 1 for sensing the vehicle speed, the automatic releasing will be accomplished without causing excessive over driving. The stop switch 91 most frequently utilized in the releasing operation is provided with fuse 102. If this fuse is broken down, no base current will flow through the transistor 73, even when the stop switch 91 is closed. However, the base current of the transistor 71 will be absorbed through the diode 87 to make an automatic releasing.

After the operation of the brake and clutch has been released, when it is desired to make again the automatic driving at the speed before such releasing, the resume switch 106 is temporally closed. The resume switch 106 absorbs the base current of the transistor 73 through the diode 104, thereby turning off the transistor 73 and turning on the transistor 71 to energize the releasing valve solenoid 84. The ON-OFF operation of the transistor 67 is caused in response to the output of the comparator 41 to energize the modulator valve solenoid, thereby maintaining the vehicle speed at the desired value.

As described above, the present invention brings forth remarkable effects in that the driving speed is affected neither by changes in the voltage of the power source nor by changes in the temperature. Thus precise and good constant speed driving can be accomplished.

It should be understood by those skilled in the art that although various circuits, such as the speed memory circuit and the error signal generating circuit, and the analog circuit are used in the embodiment described above, the present invention can easily be practiced by using a digital control.

I claim:
1. A vehicle constant speed driving apparatus comprising:
   means for providing a vehicle actual speed signal;
   means for providing a vehicle target speed signal;
   means for comparing said vehicle actual speed signal and said vehicle target speed signal and for generating a throttle valve control signal representing the difference between said compared signals;
   a vacuum actuator including a vacuum chamber for controlling a throttle valve, a normally-closed releasing valve for coupling, when open, said vacuum chamber to the ambient atmosphere, a releasing valve solenoid for selectively opening said releasing valve, a modulator valve for coupling, when open, said vacuum chamber to the ambient atmosphere and for coupling, when closed, said vacuum chamber to a pressure source, and a modulator valve solenoid disposed in substantially the same thermal condition as the releasing valve solenoid for selectively opening and closing said modulator valve; and
   a current control circuit responsive to said throttle valve control signal for selectively supplying a constant current to said releasing valve solenoid and a voltage varied by said constant current to said modulator valve solenoid to compensate for the effects of changes in the temperature of said releasing valve solenoid and said modulator valve solenoid and to control the pressure in said vacuum chamber thereby controlling the opening of said throttle valve to minimize the difference between said vehicle actual speed signal and said vehicle target speed signal.

2. The vehicle constant speed driving apparatus according to claim 1, wherein said constant current controlling circuit comprises:
   a first transistor connected between a battery and said releasing valve solenoid;
   a second transistor connected between said battery and said modulator valve solenoid; and
   a resistor connected between the emitters of said first and second transistors; and
   wherein a base of said second transistor is connected to a collector of said first transistor and an emitter of said second transistor is connected to a base of said first transistor.

* * * * *